US007739082B2

(12) United States Patent
Scherrer

(10) Patent No.: US 7,739,082 B2
(45) Date of Patent: Jun. 15, 2010

(54) SYSTEM AND METHOD FOR ANOMALY DETECTION

(75) Inventor: Chad Scherrer, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 794 days.

(21) Appl. No.: 11/423,046

(22) Filed: Jun. 8, 2006

(65) Prior Publication Data

US 2007/0294187 A1    Dec. 20, 2007

(51) Int. Cl.
G06F 17/10    (2006.01)
(52) U.S. Cl. .......................................... 703/2
(58) Field of Classification Search .............. 703/2; 705/75
See application file for complete search history.

(56) References Cited

U.S. PATENT DOCUMENTS

| | | | |
|---|---|---|---|
| 6,091,846 A * | 7/2000 | Lin et al. .................... 382/145 |
| 2002/0129264 A1 | 9/2002 | Rowland et al. | |
| 2002/0144156 A1 | 10/2002 | Copeland, III | |
| 2002/0161763 A1 | 10/2002 | Ye et al. | |
| 2003/0172302 A1 | 9/2003 | Judge et al. | |
| 2003/0236652 A1 | 12/2003 | Scherrer | |
| 2004/0221190 A1 | 11/2004 | Roletto et al. | |
| 2005/0193281 A1 | 9/2005 | Ide et al. | |
| 2005/0220265 A1 * | 10/2005 | Besson ........................ 378/16 |
| 2008/0201278 A1 * | 8/2008 | Muller et al. ................. 706/12 |

FOREIGN PATENT DOCUMENTS

| | | |
|---|---|---|
| WO | WO 00/07312 A1 | 2/2000 |
| WO | WO 02/21802 A1 | 3/2002 |

* cited by examiner

*Primary Examiner*—Paul L Rodriguez
*Assistant Examiner*—Andre Pierre Louis
(74) *Attorney, Agent, or Firm*—Woodard, Emhardt, Moriarty, McNett & Henry LLP

(57) ABSTRACT

A system and method for detecting one or more anomalies in a plurality of observations is provided. In one illustrative embodiment, the observations are real-time network observations collected from a stream of network traffic. The method includes performing a discrete decomposition of the observations, and introducing derived variables to increase storage and query efficiencies. A mathematical model, such as a conditional independence model, is then generated from the formatted data. The formatted data is also used to construct frequency tables which maintain an accurate count of specific variable occurrence as indicated by the model generation process. The formatted data is then applied to the mathematical model to generate scored data. The scored data is then analyzed to detect anomalies.

36 Claims, 8 Drawing Sheets

SYSTEM AND METHOD FOR ANOMALY DETECTION

GOVERNMENT RIGHTS

This invention was made with Government support under Contract Number DE-AC05-76RL01830 awarded by the U.S. Department of Energy. The Government has certain rights in the invention.

FIELD OF THE INVENTION

The invention is related to analyzing a plurality of data. More particularly, the invention is related to systems and methods that evaluate large quantities of data.

BACKGROUND OF THE INVENTION

Anomaly detection has been applied to computer security, network security, and identifying defects in semiconductors, superconductor conductivity, medical applications, testing computer programs, inspecting manufactured devices, and a variety of other applications. The principles that are typically used in anomaly detection include identifying normal behavior and a threshold selection procedure for identifying anomalous behavior. Usually, the challenge is to develop a model that permits discrimination of the abnormalities.

In computer security applications one of the critical problems is distinguishing between normal circumstance and "anomalous" or "abnormal" circumstances. For example, computer viruses can be viewed as abnormal modifications to normal programs. Similarly, network intrusion detection is an attempt to discern anomalous patterns in network traffic. The detection of anomalous activities is a relatively complex learning problem in which the detection of anomalous activities is hampered by not having appropriate data and/or because of the variety of different activities that need to be monitored. Additionally, defenses based on fixed assumptions are vulnerable to activities designed specifically to subvert these assumptions.

To develop a solution for an anomaly detection problem, a strong model of normal behaviors needs to be developed. Anomalies can then be detected by identifying behaviors that deviate from the model.

SUMMARY OF THE INVENTION

A system and method for detecting one or more anomalies in a plurality of observations is described. In one illustrative embodiment, data is extracted from the observations and formatted to facilitate downstream processing. A mathematical model is generated from the formatted data. The formatted data is then used to construct frequency tables that efficiently maintain a count of the current observations. A collection of data and the mathematical model are then used to generate scored data. The scored data is then processed to detect anomalies and can be clustered with surrounding observations for analysis.

In one form, the collection of data used to generate the scored data is the same as the data extracted from the observations.

In another form, the collection of data used to generate the scored data is a new set of data collection from ongoing observations.

In the illustrative embodiment, the observations are real-time network observations collected from a plurality of network traffic that include source and destination Internet Protocol (IP) addresses and ports, time, protocol, and payload size. A discrete decomposition of each variable is then taken using a method which maintains the order structure of the interval. Derived variables are then introduced in order to increase symmetry in the formatted data and introduce efficiencies into the desired queries.

In another embodiment, the observations may be financial transactions, such as consumer credit or debit card transactions collected from a payment processing network such as VISA or MASTERCARD. These observations may include the date and time of the transaction, the amount, the nature of the charge, and the retailer.

In the illustrative embodiment, the frequency tables are data structures utilizing a data storage method based upon the idea of AD-trees. The tree structure includes a plurality of nodes each containing a count corresponding to the number of observations matching the variable combination specified by the path to the node. By comparing this count to the total number of observations, the probability of a particular observation occurring can be readily determined.

The mathematical model is generated from the extracted data. In one illustrative embodiment, the mathematical model is a conditional independence model. The mathematical model is represented as a mathematical expression involving the combination of numerous probabilities of the observation variables grouped based upon discovered dependencies.

In one illustrative example, the scored data is generated from the observed data using the mathematical model. The scored data is then compared to at least one identified threshold to determine if one or more anomalies have been detected.

The system and method also permits the frequency tables to be continuously updated with recently observed data. Typically, as the counts are merged into the frequency tables, a unique method of "decay" is used to increase the impact of recent data allowing the model to conform to more recent activity.

DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the claims. The following detailed description is, therefore, not to be taken in a limited sense.

The illustrative anomaly detection system and methods have been developed to assist a security analyst in identifying, reviewing and assessing anomalous network traffic behavior. It shall be appreciated by those skilled in the art having the benefit of this disclosure that these illustrative systems and methods can be applied to a variety of other applications that are related to anomaly detection. For purposes of non-limiting example, the system and methods may be applied to other systems such as wireless and landlines, email and USPS mail, and infrastructure analysis of transportation, electrical power grids, credit card transactions, and banking systems.

For the illustrative embodiment of cyber security and/or network intrusion, an anomalous activity is an intrusion that results in the collection of information about the hosts, the network infrastructure, the systems and methods for network protection, and other sensitive information resident on the network. In order to provide background information, U.S. patent application Ser. No. 10/449,755 is hereby incorporated by reference to the extent not inconsistent with the current description.

The preferred embodiment of the system and methods for anomaly detection involves operating upon a single collection of data observations. The observations could be a collection of observations gathered over a course of an hour, a day, several weeks or several months.

In an alternate embodiment, the system and methods for anomaly detection reside on a system connected to a network and operate upon real time observations. The system may include each observation that enters a network, each observation that passes through a certain point in a network, or some other combination of observations from a network.

Figure 1:
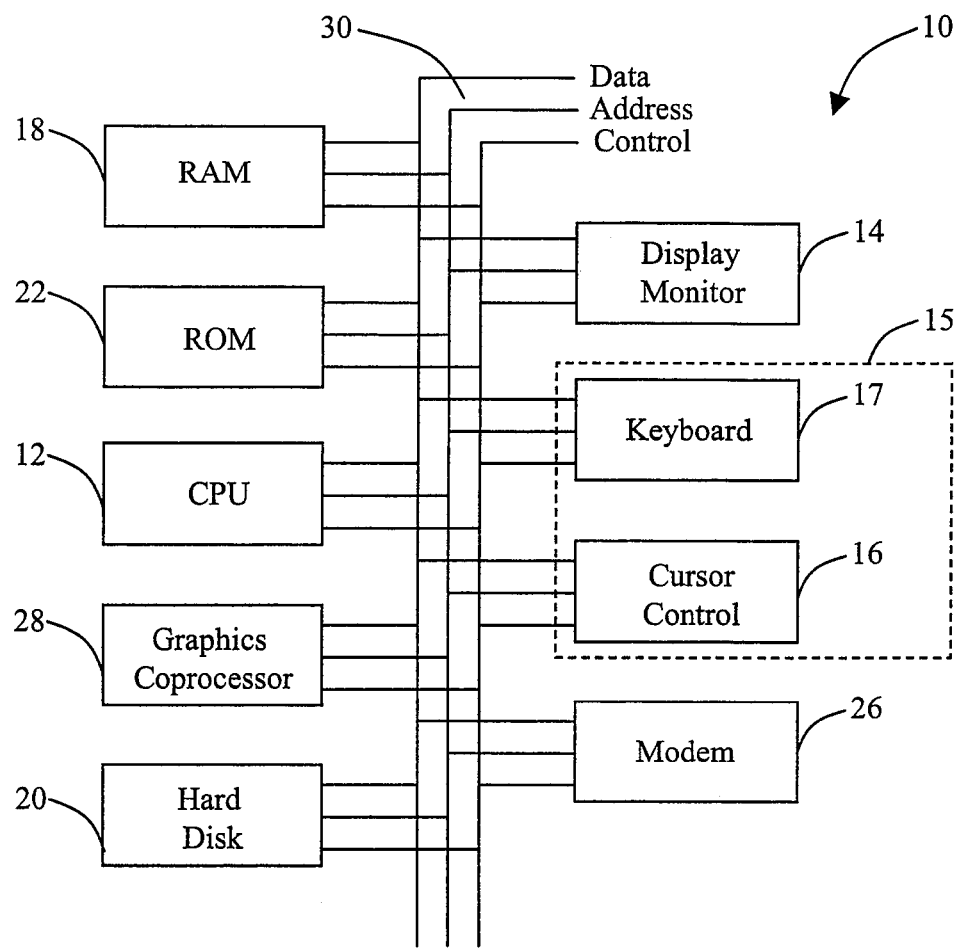
FIG. 1 is an illustrative general purpose computer

Referring to FIG. 1 there is shown an illustrative general purpose computer 10 suitable for implementing the systems and methods described herein. The general purpose computer 10 includes at least one central processing unit (CPU) 12, a display such as monitor 14, and an input device 15 such as cursor control device 16 or keyboard 17. The cursor control device 16 can be implemented as a mouse, a joy stick, a series of buttons, or any other input device which allows user to control the position of a cursor or pointer on the display monitor 14. Another illustrative input device is the keyboard 17. The general purpose computer may also include random access memory (RAM) 18, hard drive storage 20, read-only memory (ROM) 22, a modem 26 and a graphic co-processor 28. All of the elements of the general purpose computer 10 may be tied together by a common bus 30 for transporting data between the various elements.

The bus 30 typically includes data, address, and control signals. Although the general purpose computer 10 illustrated in FIG. 1 includes a single data bus 30 which ties together all of the elements of the general purpose computer 10, there is no requirement that there be a single communication bus which connects the various elements of the general purpose computer 10. For example, the CPU 12, RAM 18, ROM 22, and graphics co-processor might be tied together with a data bus while the hard disk 20, modem 26, keyboard 24, display monitor 14, and cursor control device are connected together with a second data bus (not shown). In this case, the first data bus 30 and the second data bus could be linked by a bi-directional bus interface (not shown). Alternatively, some of the elements, such as the CPU 12 and the graphics co-processor 28 could be connected to both the first data bus 30 and the second data bus and communication between the first and second data bus would occur through the CPU 12 and the graphics co-processor 28. The methods of the present invention are thus executable on any general purpose computing architecture, but there is no limitation that this architecture is the only one which can execute the methods of the present invention.

The system for detecting one or more anomalies may be embodied in the general purpose computer 10. A first memory such as RAM 18, ROM 22, hard disk 20, or any other such memory device can be configured to store data for the methods described. An observation may be a multivariate quantity having a plurality of components wherein each component has a value that is associated with each variable of the observation. For the illustrative embodiment the observations are real-time network observations collected from a plurality of network traffic which may include, by way of non-limiting example, Internet Protocol (IP) addresses, port numbers, time, protocol, and payload size. It shall be appreciated by those of ordinary skill in the art that an observation may also be referred to as a data record.

The processor 12 is programmed to apply one or more formatting processes to the data, for example processor 12 may apply a discrete decomposition to one or more variables of each observation in the observed data. Additionally, processor 12 may perform a formatting process which includes the introduction of derived variables that facilitate efficient algorithms in later processing. It should be understood that further formatting processes known to one skilled in the art may also be performed to properly structure the data.

Processor 12 is then programmed to generate a first mathematical model and frequency tables from the formatted data. In one form, the conditional independence relationships indicated by the model is utilized to selectively store a subset of the available joint probability distributions in the frequency tables. The processor 12 is further programmed to generate scored data by applying a collection of data to the first mathematical model, and then to analyze the scored data to detect one or more anomalies.

In the illustrative embodiment the mathematical model that the processor 20 is programmed to generate is a conditional independence model. This conditional independence model is composed of a mathematical relationship representing the dependencies between the variables in the system.

A second memory residing within said RAM 18, ROM 22, hard disk 20, or any other such memory device is configured to store a plurality of formatted data. Recall formatted data is the data resulting from the application of one or more formatting processes. Preferably, the formatting processes include a discrete decomposition of one or more variables associated with each observations and the introduction of derived variables. The second memory is also configured to store the mathematical model and frequency tables generated from the formatted data. Additionally, the processor 12 is programmed to gradually increase with time the count associated with each observation so that older data, i.e. historical data, is given a reduced impact within the frequency tables. The processor 12 may then take the updated and decayed frequency tables and generate scored data using the first mathematical model.

The processor 12 is programmed to analyze the scored data once it has been generated. In one illustrative example, the scored data is analyzed by identifying at least one threshold for anomaly detection. The threshold value may be identified by an analyst or may be a pre-programmed default value. For example, the processor 12 may be programmed to utilize intelligent techniques to dynamically set the threshold for anomaly detection based upon the current data set. The processor 12 is programmed to then compare the threshold to the scored data to determine if one or more anomalies have been identified.

Additionally, the system embodied in the general purpose computer 10 may also provide for programming the processor 12 to cluster the plurality of scored data. Clustering provides an additional method for analyzing the scored data. The processor may be programmed to cluster the scored data that is similar to an existing cluster, and to cluster scored data above a threshold.

Figure 2:
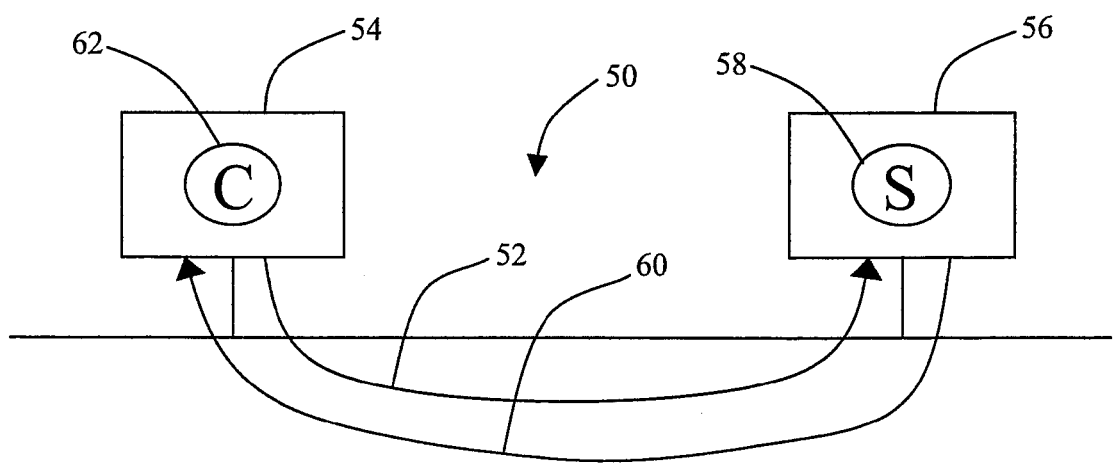
FIG. 2 is an illustrative client server system

Alternatively, the techniques described herein can be implemented in a client/server architecture, such as that shown in FIG. 2. It shall be appreciated by those of ordinary skill in the art that client/server architecture 50 can be configured to perform similar functions as those performed by the general purpose computer 10. In the client-server architecture, communication generally takes the form of a request message 52 from a client 54 to the server 56 asking for the server 56 to perform a server process 58. The server 56 performs the server process 58 and sends back a reply 60 to a client process 62 resident within client 54. Additional benefits from use of a client/server architecture include the ability to store and share gathered information and to collectively analyze gathered information. In another alternative embodiment, a peer-to-peer network (not shown) can also be used to implement the present system and method.

Referring back to FIG. 1, with continued reference to FIG. 2, the general purpose computer 10, client/server network system 50, and peer-to-peer network system execute a sequence of machine-readable instructions. These machine readable instructions may reside in various types of signal bearing media. In this respect, one aspect of the present invention concerns a programmed product, comprising signal-bearing media tangibly embodying a program of machine-readable instructions executable by a digital data processor such as the CPU 12 for the general purpose computer 10.

It shall be appreciated by those of ordinary skill that the computer readable medium may comprise, for example, RAM 18 contained within the general purpose computer 10 or within a server 56. Alternatively the computer readable medium may be contained in another signal-bearing media, such as a magnetic data storage diskette that is directly accessible by the general purpose computer 10 or the server 56. Whether contained in the general purpose computer or in the server, the machine readable instruction within the computer readable medium may be stored in a variety of machine readable data storage media, such as a conventional "hard drive" or a RAID array, magnetic tape, electronic read-only memory (ROM), an optical storage device such as CD-ROM, DVD, or other suitable signal bearing media including transmission media such as digital and analog and communication links. In an illustrative embodiment, the machine-readable instructions may comprise software object code from a programming language such as C++, Java, or Python.

Figure 3:
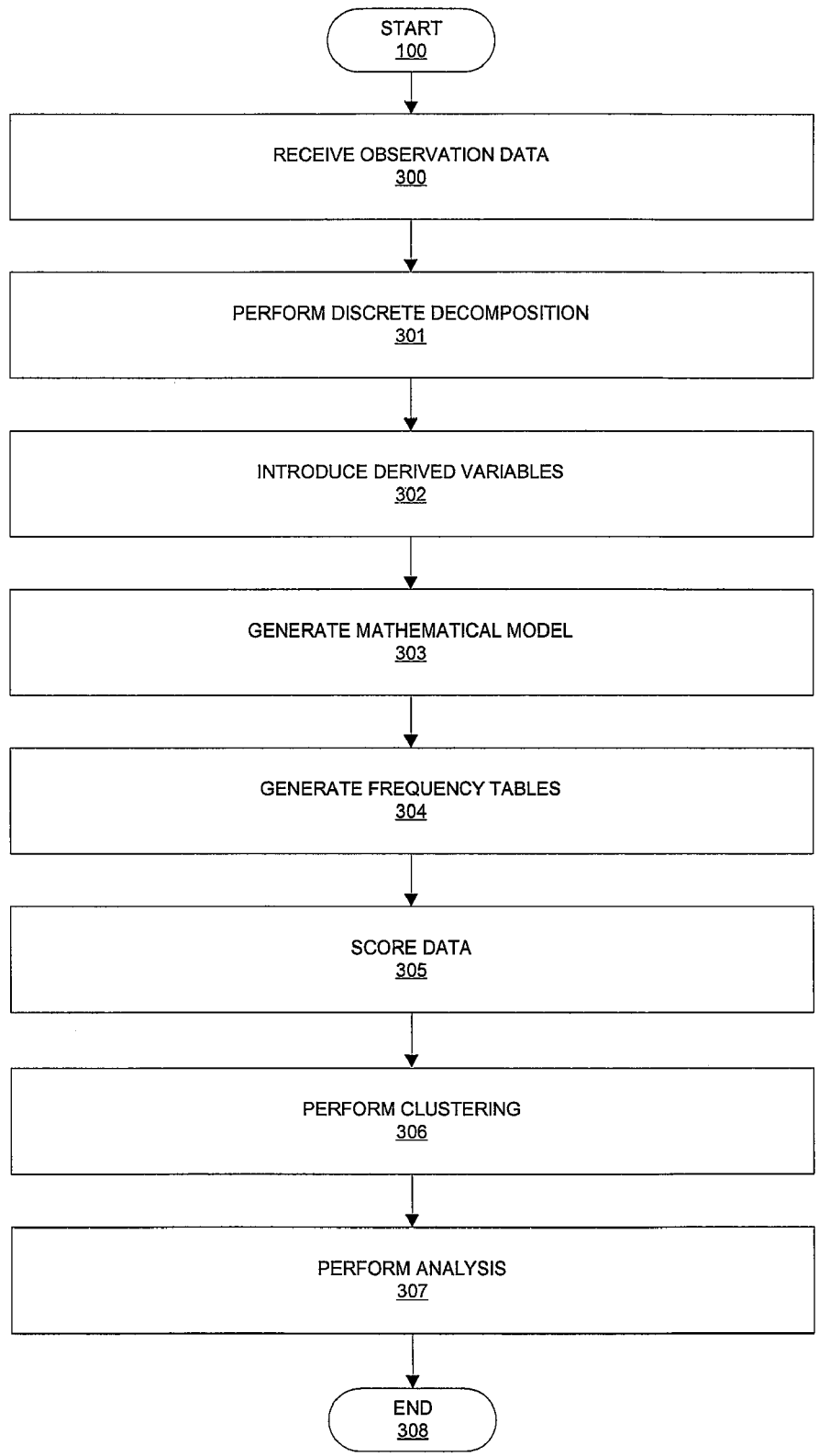
FIG. 3 is a flowchart of a method for anomaly detection

FIG. 3 is a flowchart of one method 100 for anomaly detection. In this flowchart, the various blocks describe the various processes that are associated with the transfer of control from one process block to another process block. The processes described in FIG. 3 are substantially similar to the processes indicated by circular processes in FIG. 4, and have thus been indicated by the same reference numerals.

The method 100 is initiated in process block 300 where the raw data is collected. As described herein, the raw data in the illustrative embodiment is composed of a plurality of network observations. In one form, this raw data may be extracted from a network stream and stored in a simple text file for subsequent data processing.

After the raw data is received in process block 300, a discrete decomposition takes place in process block 301. Generally, the discrete decomposition takes a collection of nominal data and approximates the data with a discrete representation. In the illustrative embodiment, for example, the payload size is represented as a collection of binary variables. Additionally, other variables are assigned unique integer identifiers. In other words, the first IP address would be represented by the integer 1. If that IP address is seen again, it would also be represented by a 1. Then, the second unique IP address would be represented by a 2 and so on. The unique IP addresses may then be stored in a simple look up table for later analysis. It shall be understood that many other variables may also be represented as binary variables in the present system and method.

The method then proceeds to process block 302 where a set of derived variables may be added to the discrete data in order to advantageously format the data for subsequent processing. In the illustrative embodiment, the introduction of a transactional direction indicating variable enables the set of queries to be greatly simplified during frequency table generation.

Preferably, the method generates a mathematical model with the formatted data in process 303. Alternatively, the method can bypass the data formatting process 302 and use the discrete data or raw data to generate a mathematical model. In the illustrative embodiment, the mathematical model is a conditional independence model.

Once the mathematical model has been generated in process block 303, a select grouping of desired probability distributions, determined from the conditional independence relationships indicated by the model, may be passed to the frequency table generation process block 304. Process 304 then iterates over the formatted data and constructs the frequency tables. In the illustrative embodiment, the frequency tables are in the form of an AD tree, which is a data structure containing pre-computed answers to counting queries. Use of an AD tree, partial AD tree, or other similar formatted data structure facilitates quick retrieval of desired probabilities without the need for on demand calculations.

The method then generates a plurality of scored data records in process block 305. In one form, formatted data from process 302 is applied to the mathematical model from block 303 to generate scored data in process block 305. Alternatively, raw data or discrete data from process blocks 300 and 301 respectively is applied to the mathematical model from block 303 to generate the scored data in process block 305. In another form, a collection of data distinct from the formatted data may be applied to the mathematical model from block 303 to generate scored data in process block 305.

Although analysis of the scored data can be performed immediately after generating the scored data, it is preferable to perform the additional process of clustering the scored data in process block 306. Certain benefits may be associated with clustering the scored data that include providing an additional analytical tool, and the ability to generate a two-dimensional or three-dimensional view of the detected anomalies. By way of example and not of limitation, clustering is performed when the scored data is determined to be similar to an existing collection of data points. Similarity may be determined using the Minkowski Metric or another similarity or distance metric known to one of skill in the art. It shall be understood that analysis may be performed on the scored data before or after a clustering process.

Once the scored data has been generated, and clustered if desired, the scored data is analyzed in process block 307 to detect anomalies. In one illustrative example, the scored data is analyzed by identifying at least one threshold for anomaly detection. The scored data is then compared to the threshold to determine if one or more anomalies have been identified.

Figure 4:
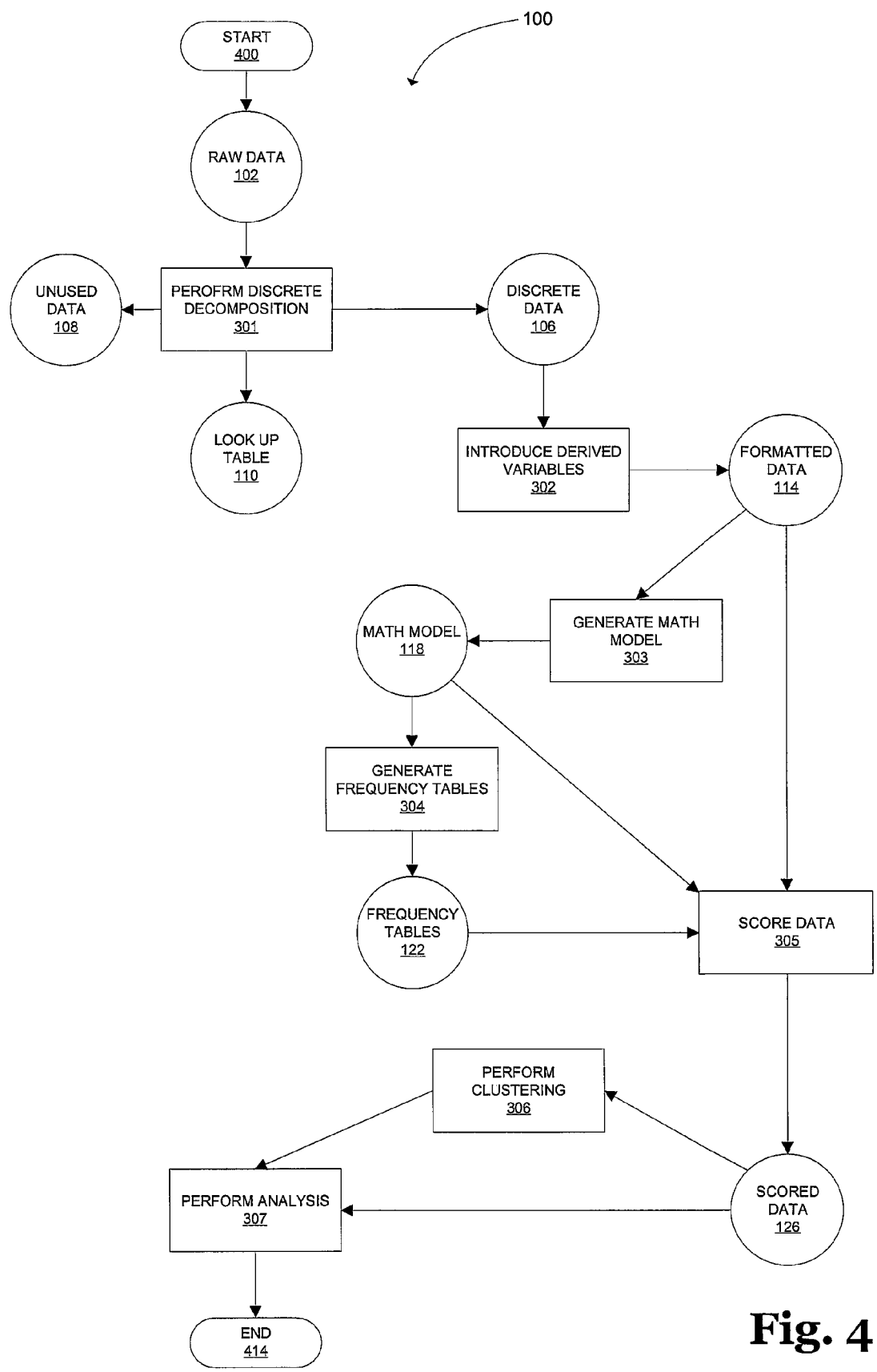
FIG. 4 is a data flow diagram for detecting anomalous activities

FIG. 4 is a data flow diagram that describes in greater detail the data flow of the illustrative embodiment for detecting anomalous activities within a plurality of data records or observations. It shall be appreciated that FIG. 4 contains the processes depicted in FIG. 3, but also includes the data types flowing between these respective processes.

The method 100 is initiated with the receiving of a plurality of raw data records identified by block 102. The raw data records represent a plurality of observations that are stored in a memory such as RAM 18, ROM 22, or hard disk 20 of FIG. 1. In the illustrated embodiment, the raw data records are received in a text file containing TCP dump data and subsequently extracted to a simple list of observations.

For illustrative purposes only, the observed data is typically categorical data of a directional nature. Each observation is a multivariate quantity having a plurality of components wherein each component has a value that is associated with each variable of the observation. Categorical variables represent types of data which may be divided into groups. Examples of categorical variables are sex, nationality, age group, and educational level. While the latter two variables may also be represented in a continuous manner, by using exact values for age and highest grade completed, it is often more conducive to modeling to categorize such variables into a comparatively small number of groups.

Directional data is data that is measured on a scale that repeats itself such as hours in the day or angular directions. For example, the time between 11:00 am and 1:00 pm is commonly known to be 2 hours, not the 10 hours a standard mathematical operation might return. Thus, in order to accurately maintain the topology of the data, different metrics must be utilized in order to obtain the desired relationship.

Discrete Decompositon

In the illustrative embodiment, after the raw data is received in block 102, a discrete decomposition 301 of one or more continuous variables within each observation may be taken. Generally, a discrete decomposition approximates a continuous variable with a family of discrete variables. One approach is commonly known as "binning," because each discrete variable represents a certain interval of the continuous variable. This approach approximates a continuous variable as a vector of binary variables with one non-zero value. If the discrete variable representing a certain bin has value 1, the continuous variable is said to be in that bin. For example, if one wanted to decompose the unit interval [0, 1] into a family of 10 binary variables, one approach would be represented by the following.

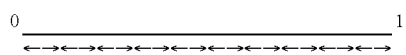

Here each arrow represents a distinct binary variable, determined by the application of the appropriate indicator function to the given variable. An indicator function is a function defined on a set X, which is used to indicate membership of an element in a subset A of X. The indicator function of a subset A of X is a function $I_A(x):X \rightarrow \{0,1\}$ defined as $$I_A(x) = \begin{cases} 1 \text{ if } x \in A \\ 0 \text{ if } x \notin A \end{cases}.$$

The transformation described by this decomposition maps each point in the continuous interval to a binary vector which represents the interval, or bin, containing the variable. In this example, we would have 0.1→1000000000
0.2→0100000000
0.3→0010000000
$\lambda$
0.9→0000000001

A drawback of this approach is that the topology of the interval is generally lost. Going from one subinterval to another results in a change in at least two variables, regardless of proximity.

The approach to discrete decompositions utilized by the illustrative embodiment involves overlapping intervals or "bins." This method is effective for decomposing the payload size of each observation. In this method each indicator function has the same starting point, but the end points differ. This produces a set of overlapping bins as represented below.

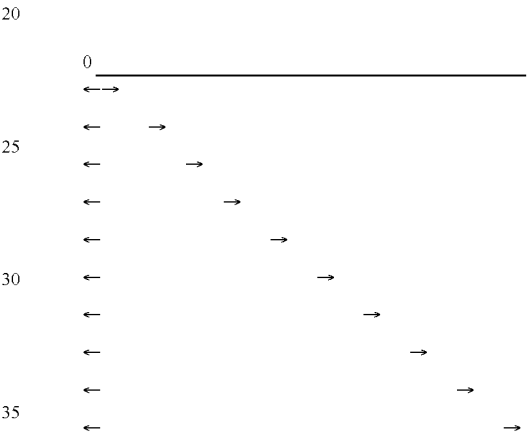

Here each pair of arrows represents a range which corresponds to a distinct binary variable, with each range containing the range corresponding to the previous variable. Thus, the indicator function of bin A, $I_{A+1}(x)$ is assured to evaluate to 1 if the indicator function of bin A, $I_A(x)$, evaluates to 1.

The transformation described by this decomposition maps each point in the continuous interval to a binary vector which represents the interval(s) containing the variable. In this example, we would have 0.1→1111111111
0.2→0111111111
0.3→0011111111
$\lambda$
0.9→0000000001

Thus, with this decomposition, movement across a boundary now only results in a change to one variable. The more variables that are different in two decompositions, the larger the distance between the points represented on the interval. In other words, the number of variables that are different coordinates with the distance between the points. Conversely, a fewer number of variables that are different correlates with points that are relatively close together. In this way, the mapping provides a relatively efficient measure of the closeness of the variables. Using a simple AND operation, the mappings provide a computationally efficient method for proximity detection. Further, families of discrete random variables built in this way will also be highly dependent, making efficient storage possible utilizing the frequency tables described below.

A similar approach may be used to decompose circular variables. In the illustrative embodiment, a circle may be decomposed into a set of twelve overlapping half-circles. Alternatively, a different number of overlapping arcs could be used depending upon the level of generalization desired. This method is particularly useful in decomposition of the time variable of each observation. Each half circle interval preferably begins on a 30 degree interval and encompasses 180 degrees. A binary vector may then be constructed comprising a one for each half-circle the time point lies within and a 0 for each it lies outside of. Note that under this decomposition, any antipodal pair of points on the circle differs in every component, while a pair of adjacent points differs in at most one component.

In the illustrated embodiment, the discrete decomposition process 301 produces discrete data 106 which is an approximation of the raw data received from process block 102. Additionally, the process may also include the conversion of the data into a data structure that facilitates downstream processing. For example, in the illustrative embodiment, the discrete decomposition of IP Addresses and port numbers involves assigning a unique natural number to each new record as it is seen. A look-up table 110 is then constructed which will store the unique IP address or port number and their corresponding natural number for future reference. The remaining plurality of unused data 108 can be processed and stored to allow correlation later in the system, or discarded.

Derived Variables

Once the discrete decomposition has taken place in step 301, derived variables may be added to the formatted data to introduce more symmetry in step 302. To generate a good model of the observed data it is helpful to be able to easily retrieve marginal probabilities corresponding to the relative frequency of a particular observation. These additional variables will introduce efficiencies and facilitate downstream processing. For example, a simple transaction involving one message being sent from A to B and a reply from B to A would be represented in tabular form by:

| Transaction | SRC | DEST |
|---|---|---|
| 1 | A | B |
| 2 | B | A |

In the illustrative embodiment, in order to introduce these efficiencies, for example, the derived variable SWAP as well as an additional row for each record is added to the data. The new representation is now:

| Transaction | Node 1 | Node 2 | SWAP |
|---|---|---|---|
| 1 | A | B | 0 |
|  | B | A | 1 |
| 2 | B | A | 0 |
|  | A | B | 1 |

While these two representations may appear to be similar, the addition of the derived variables greatly affects the logic required to make certain queries. Below is a table of several queries and the logic required in each data representation.

| Transaction Type | Direct Approach | Revised Approach |
|---|---|---|
| A → ? or ? → A | SRC = A or DEST = A | Node1 = A |
| A → ? | SRC = A | Node1 = A and SWAP = 0 |
| ? → A | DEST = A | Node2 = A and SWAP = 0 |
| A → B or B → A | (SRC = A and DEST = B) or (SRC = B and DEST = A) | Node1 = A and Node2 = B |
| A → B | SRC = A and DEST = B | Node1 = A and Node2 = B and SWAP = 0 |

By including derived variables of the aforementioned form, the use of "or" logic is eliminated in all of the transaction types of interest. Since the computation involving "and" connectives is already implicitly done in any multivariate joint count or joint probability measure, we can improve performance in these algorithms by providing properly formatted data.

The formatted data 114, which results from the introduction of derived variables in process 302, may then be passed to process 303 where the mathematical model is generated. In the illustrative embodiment, the mathematical model is a conditional independence model. The process 303 of generating this mathematical model 118 will be discussed in detail below with reference to FIG. 5.

The formatted data 114 which is produced in process 302 is also used to construct a set of frequency tables corresponding to a set of dependencies determined from the mathematical model in the frequency table generation process 304. The frequency tables 122 contain marginal probability data associated with these indicated subsets of the given set of variables. In the illustrative embodiment, the frequency tables 122 generated during the frequency table generation process 304 are in the form of a tree structure. The process of generating these frequency tables 304 will be discussed in detail below with reference to FIG. 6.

The mathematical model 118 generated in process 303 is then communicated to process 305 where the formatted data 114 may be scored. Alternatively, discrete data 106 may be scored. For purposes of the illustrative embodiment, formatted data is scored by applying the formatted data 114 to the mathematical model 118 to generate scored data 126 in process 305.

During the process of scoring 305, each scored data record is assigned a real number value to indicate the relative surprise within the context of all data processed by the mathematical model in block 118. In the illustrative embodiment, the surprise score is a value based upon a probability of seeing such an observation determined by the mathematical model. Once the results from the scoring have been sorted, the scored data 126, generated by process 305, is communicated to the analyst. During analysis 307, the analyst inspects scored data with relatively high surprise values. In one illustrative embodiment the scored data is analyzed by identifying at least one threshold. The scored data 126 is then compared to the threshold to determine if one or more anomalies have been detected.

Additionally, there are benefits associated with clustering the scored data as shown in process 306 that include providing an additional analytical tool, and the ability to generate two-dimensional or three-dimensional views of the detected anomalies. In the illustrative embodiment, a metric is used that allows the relative distance between two discrete representations of a data record to be accurately compared. By way of example and not limitation, clustering is performed when the scored data is similar to an existing cluster. Additionally, clustering of the scored data can also be performed by using a threshold to cluster the scored data.

The purpose of the clustering process 306 is to give an analysis "context" by which an analysis can be conducted. A single high scoring result gives little help to analysts unless the reason for the high score is known. Additionally, it would be preferable to identify other data records, formatted data records, or scored data records that may relate to the single high scoring result. This permits the analyst to dive deeper into the examination during analysis 307. It is envisioned that there may be several clusters generated from a single high surprise value seed. By way of example and not of limitation, these clusters may group records based upon minimal distance of the seed by looking at geographic, organizational, time or activity measures.

By combining a comparative analysis of a mathematical model, with the scoring results and the clustering of the scored data, the method 100 provides a simple and robust procedure for detecting anomalous network behavior. It shall be appreciated by those of ordinary skill in the art having the benefit of this disclosure that these methods may also be adapted for use in other applications related to detecting anomalies in a plurality of data records.

Mathematical Model

Figure 5:
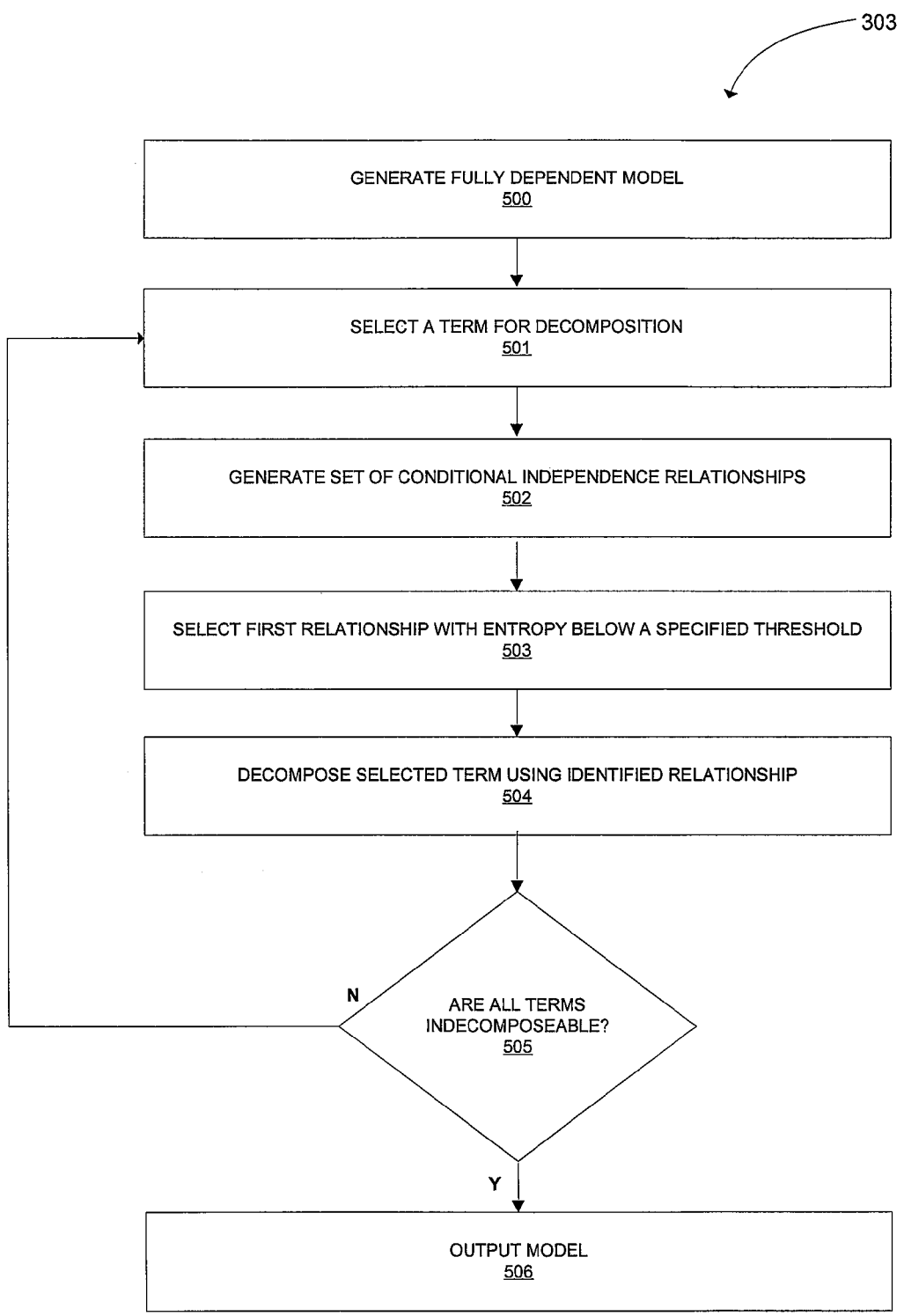
FIG. 5 is a flowchart for an illustrative method of model generation

Referring to FIG. 5 there is shown a flowchart for a method of automated model generation. The illustrative method of automated model generation 303, described in FIGS. 3 and 4, generates a mathematical model using the formatted data 114. The mathematical model is capable of adapting dynamically to changes in data characteristics, such as relative counts of variable occurrences. In the illustrative method of automated model generation, the mathematical model is a conditional independence model.

A conditional independence model is a class of statistical models which represents the conditional independence relationships among the variables of a probability distribution. Conditional independence is applied in the analysis of interactions among multiple variables to recursively decompose the full joint distribution. It shall be appreciated by those skilled in the art of statistics that conditional independence is based on the concept of random variables and joint probability distributions over a set of random variables.

For example, consider a collection of data, with each observation representing a child's shoe size and their respective reading level. Considering only these two variables, age and shoe size, it appears that a strong relationship exists between reading level and shoe size. However, when the age of each child is taken into account, it becomes clear that reading level and shoe size are independent of each other. Thus, taking additional variables into account helps to avoid unreasonable conclusions that might otherwise be drawn.

In the illustrative embodiment, a surprise score is assigned to each observation based on the resulting model. Preferably, the surprise score is determined by the function $s(x)=-\log P(x)$, where $s(x)$ is the surprise score assigned to the observation x, and $P(x)$ is the probability of seeing an observation having the attributes associated with observation x. Thus, when the probability indicated by the model of seeing a particular observation is low, the negative logarithm translates this value into a relatively high surprise score which can be detected as anomalous. Alternatively, other methods of scaling can be applied to the probability returned by the model in order to generate a surprise score.

The mathematical model is capable of representing various dependencies amongst the variables associated with a set of observations. For example, if you consider the set of observations having five associated variables, namely A, B, C, D, and E, then a fully dependent model would be represented as P(ABCDE). This model assigns a probability based upon the ratio of the number of observations matching each variable A through E over the total number of observations. However, if the terms A and B are found to be independent, a more accurate model may be the probability of an observation matching A combined with the probability of an observation matching B combined with the probability of an observation matching CDE. This method of modeling can be extrapolated to observations of higher dimension. For the illustrative network security application, discrete variables are used for model generation. By way of example and not of limitation, the discrete variables include source and destination IP Address and port number, time, and payload size. It shall be appreciated by those of ordinary skill in the art having the benefit of this disclosure that the methods applied to the illustrative discrete variables may also be applied to continuous variables.

Turning to process block 500 of FIG. 5, the method of automated model generation begins with the fully dependent model consisting of all the variables under consideration. After generating the fully dependent graph in process block 500, the method proceeds to process block 501 where a term is selected in the mathematical model for decomposition. In the illustrative embodiment, the fully dependent model contains only one term and therefore is selected during the first iteration as the term to be decomposed. In subsequent iterations, each term is analyzed and determined to be either decomposable or indecomposable.

Once a term to be decomposed is selected in process block 501, a set of conditional independence relations that may be present in the data is calculated in process block 502. Preferably, in the illustrative embodiment, the list begins with the most restrictive conditional independence relationship and continues in a decreasing fashion. For illustrative purposes, a simple example consisting of the variables A, B, and C for a set of observations will be examined. It will be understood that only three variables are shown in order to preserve clarity, but that in the actual embodiment the idea may be expanded to operate in higher dimensions. In order to decompose the term ABC, which represents the fully dependent model, we may consider the list {<a,bc>, <ab,c>, <ac,b>, <a,b|c>, <a,c|b>, <b,c|a>} where <a,bc> represents that a is conditionally independent from bc and <a,b|c> represents that a is conditionally independent of b given c.

Turning to process block 503, in the illustrative method, the sub-term chosen should be the first one in this sequence with sufficiently small entropy. In the preferred embodiment, a threshold may be programmatically provided or furnished by the user of the system for determining when an entropy value is equivalent to zero. The term "entropy" can be applied to random variables, vectors, processes and dynamical systems, and other such information theory and communication theory principles. Intuitively, the concept of entropy is used to account for randomness in the data so that when the entropy is high, randomness is high and the relationship between the terms is weak.

To test for the presence of a condition independence relationship in the data, an entropy operator is defined. For purposes of illustrative example, the entropy operator $$H(x) = -\sum \frac{C(x)}{N} \log \frac{C(x)}{N}$$

may be used. Using this expression, the entropy of x is calculated as a function of C(x) which represents a count of the number of observations matching x and N which is the total number of observations. Additional information on entropy may be found in "Elements of Information Theory" by Thomas M. Cover and Joy A. Williams, published by John Wiley, 1991, which is incorporated by reference to the extend not inconsistent with the present disclosure.

From classical information theory, we know that for any three variables, such as A, B, and C, H(ac)+H(bc)−H(c)−H(abc)≧0, with equality only when A is conditionally independent of B given C. Thus, by utilizing entropy measures we are able to test whether or not a condition independence relation is present in the data.

Once a conditional independence relationship has been identified in process block 503, the method continues to process block 504 where the selected term is decomposed by the addition of the term by term evaluation which reduces the term to a sum of only lower-ordered terms. For example, if the term to be decomposed were ABC, as discussed above, and the conditional independence relationship <a,b|c> were identified as having sufficiently low entropy, then the term by term evaluation ac+bc−abc−c would be added to the term to be decomposed abc, leaving us with:

abc+<a,b|c>=abc+(ac+bc−abc−c)=ac+bc−c.

At decision diamond 505 the method determines whether or not further term decomposition is possible. If so, the method return to process block 501 and the iterative method is repeated upon the new model. If all of the terms of the model are indecomposable, the process is complete and the model is output at process block 506.

By looking at the final model, the method is able to determine the required frequency table entries. For example, the model ac+bc−c would require storage of frequency counts for ac, bc, and c. These combinations may be extracted and placed into a guide tree for passing to the frequency table generation process to ensure that only the count information for the variables of interest is stored.

There are several distinctions between this approach and graphical modeling. First, a general conditional independence approach allows a larger class of models to be fit. This larger model space allows greater model fidelity than the comparatively restrictive space of graphical models. There is also a significant search strategy for conditional independence modeling compared to what is typically done for graphical models. In particular, the search begins with a very general model and selects a sub model at each step, rather than the reverse. This ensures that every conditional independence assumption made by the final model is validated against the data.

Frequency Tables

Figure 6:
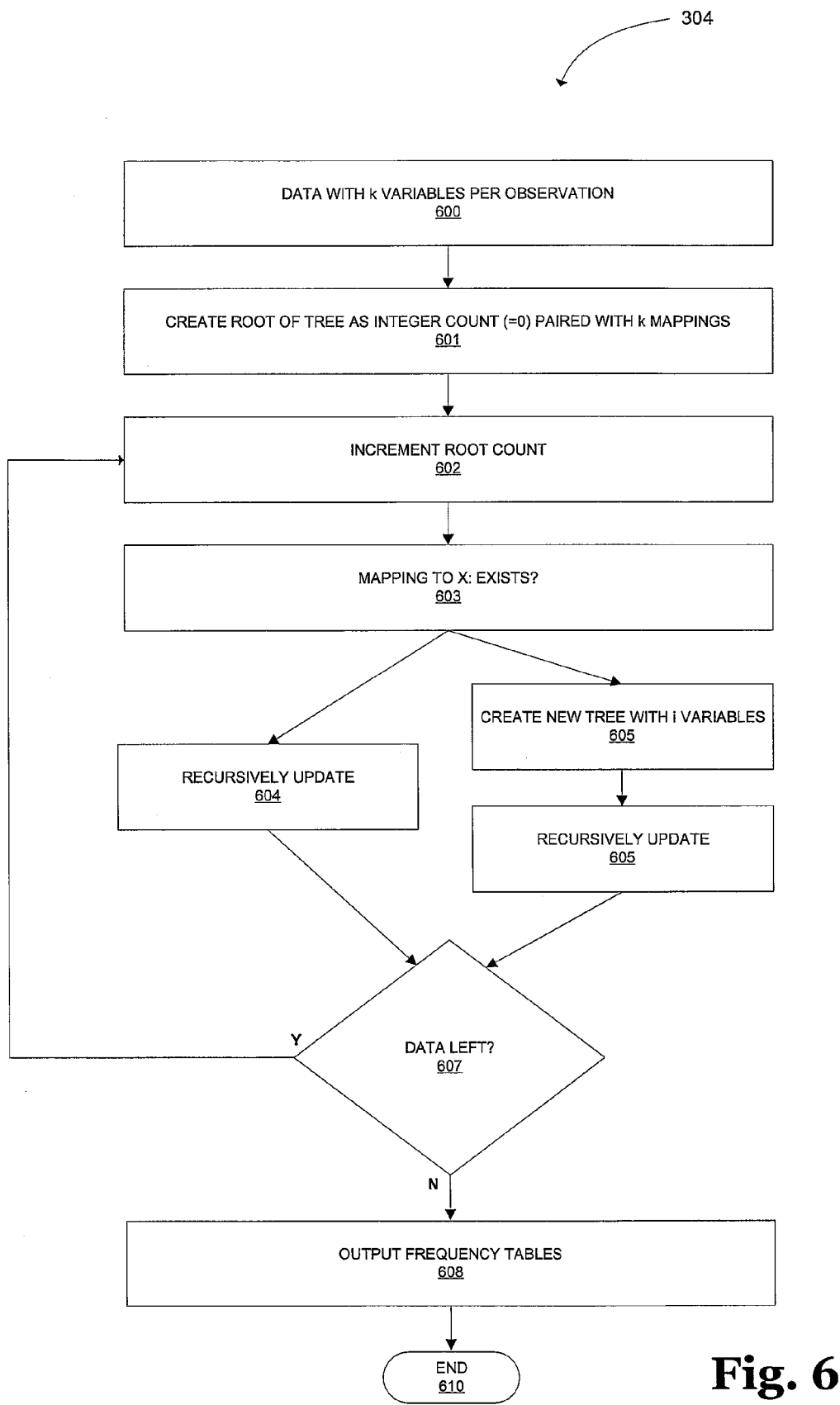
FIG. 6 is a flowchart for an illustrative method of frequency table generation

Referring to FIG. 6 there is shown a flowchart for an illustrative method of frequency table generation. The illustrative method of frequency table generation 600 generates a set of frequency tables using the formatted data resulting from the discrete decomposition of the observations and the inclusion of derived variables. The method for anomaly detection is dependant upon the availability of efficient algorithms for characterizing joint distributions associated with the indicated subsets of a given data set of variables. For each subset of variables, this characterization is performed in terms of frequency counts over the given subset. In the illustrative method of frequency table generation the frequency tables are stored in a form similar to an AD Tree.

An AD Tree is a class of data structures used to provide fast conjunctive counting queries on a dataset. During creation of an AD Tree, the entire dataset is processed and the count for every possible counting query is pre-computed. However, the illustrative method, for space and time concerns, does not construct a full AD tree.

An AD Tree starts with a root node which stores the number of records observed, and which points to another layer of nodes depending from the root node. Below that is a layer of nodes, i.e., sub-nodes, each of which assumes knowledge of the state of one variable. These sub-nodes store how many records of the database have the records of the first state, the second state, and so on until all states of that particular node are completed. These sub-nodes may also store pointers to another layer of nodes, i.e., sub-sub-nodes, each of which specify two variables. The layers can continue to branch off until all variables have been assigned a value and their respective counts calculated. The construction of an AD tree is well known in the art, for a detailed description of the recursive process see Andrew Moore and Mary Soon Lee. *Cached Sufficient Statistics for Efficient Machine Learning with Large Datasets. Journal of Artificial Intelligence Research,* 8:67-91, March 1998.

Once the tree is constructed, the cost of looking up a count is proportional to the number of instantiated or bound variables in the query. The tree is traversed by following the assumption of each variable corresponding to the query. The count is obtained from the resulting node.

The method of AD tree construction disclosed by Moore and Lee stores every joint distribution. This process can become very expensive on both processing time and data structure size when datasets grow large. In order to reduce this burden, the illustrative embodiment utilizes a guide tree to selectively store combinations of variables. This is done by providing a list of lists which specifies the path to each leaf of the tree to be created. When the tree construction comes upon a variable combination not included in the guide tree the method just maps the pointers to an empty mapping. In an alternate embodiment, in order to further reduce the amount of storage, the nodes at each sub tree are ordered according to decreasing joint entropy values.

In a preferred embodiment, the frequency tables are stored as AD trees utilizing Judy arrays. Judy arrays, which are known to one of skill in the art, are complex but very fast associative array data structures which can be used for storing and looking up values using integer or string keys. Unlike traditional arrays, Judy arrays may be sparse; that is, they may have large ranges on unassigned indices. Judy arrays were designed to keep the number of processor cache line-fills to a minimum, and as a result, are often times faster than a hash table.

In another embodiment, as the frequency tables are continuously updated, the method implements an exponential decay algorithm in order to ensure that the frequency counts conform with time to the more recent data. One method to accomplish this is to tag each entry in the frequency tables with a timestamp, so that timestamps could be updated when accessed, and decay could take place during access by scaling the accessed count relative to its age. This method has the main drawback that in order to store a timestamp with each entry the size of the data structure would essentially double.

In the illustrative embodiment, a method is utilized to ensure that older data is given a diminishing impact in order to allow frequencies to conform to more recent data. This method involves inflation of data as it is seen, rather than decay of historical data as it is accessed. When a new observation is added to the frequency table initially, the count is incremented with an extremely small value. As time passes, the count number added is gradually increased as new observations are added. In other words, the value of a single count increases with time. In one form, the value of a count increases exponentially as a function of time. For example, if the initial count contribution is $c_0$, then the addition made to the frequency tables at time t might be $c_0 2^t$. If this process is allowed to continue indefinitely, an overflow will occur. In order to remedy this, when the overflow occurs a cleanup method is called and scales every count in the frequency table by some appropriate value to return all counts to as small a value as possible.

In the preferred embodiment, the overflow can be prevented for an arbitrarily long period of time by lengthening the doubling time of the incoming counts. For example, suppose k observations are received per unit time. If the count contribution is originally $c_0$ and we begin counting at time 0, then the contribution at time t is given by $c_0 2^{t/d}$, where d is the time it takes for the counts to double. The number of records at time $t_1$ would then be $$\frac{c_0 kd}{\ln 2} 2^{t_1/d}.$$

Therefore, if we beginning counting at $c_0 = 9.88 \cdot 10^{-324}$, and we can go no higher than $N(t_1) = 1.79 \cdot 10^{308}$, and we are to double the count contribution every month and handle one million records per second, then the overflow time would be more than 171 years.

Scoring

Figure 7:
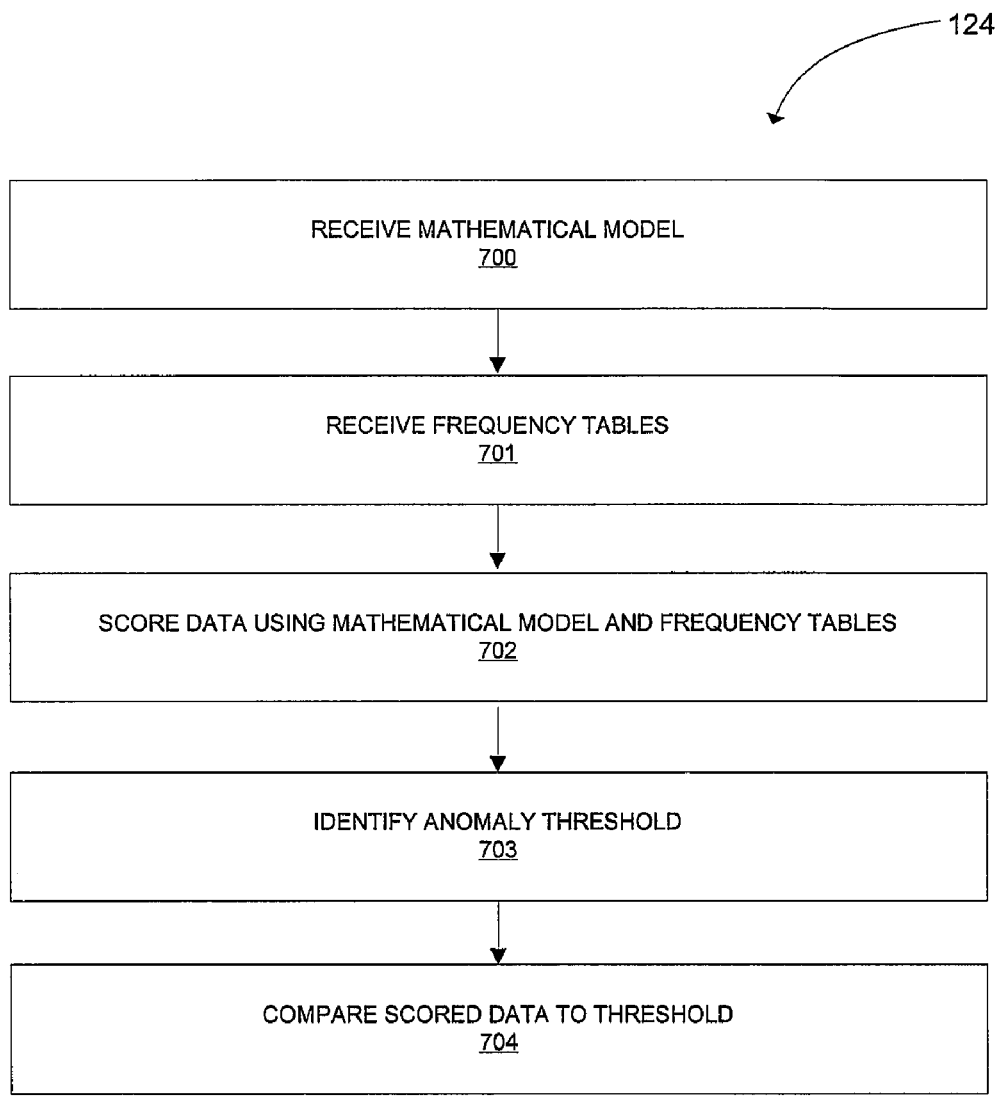
FIG. 7 is a flowchart for an illustrative method of scoring data with the mathematical model

Turning now to FIG. 7, once the mathematical model 118 and frequency tables 122 have been generated the process of scoring data 305 may begin. The process begins at stage 700 by receiving the mathematical model. Then, the process receives the frequency tables at stage 701. The process proceeds to score the collection of data by applying the data to the mathematical model 118 in process block 702. Each observation in the collection of data may be assigned a score by the model which indicates the probability of seeing such an observation. That probability may be scaled using a surprise score generating function, such as $s(x) = -\log(p(x))$ where $p(x)$ is the probability assigned.

Then, in stage 703, a threshold is identified for anomaly detection. In one form this threshold is a predetermined by the user. In another form, the system may programmatically adjust this threshold based upon recent observations. Then, in stage 704 the surprise scores assigned to the observations in the collection of data are compared to the threshold. When one surprise score exceeds the identified threshold, the associated observation is indicated as anomalous.

Clustering

Figure 8:
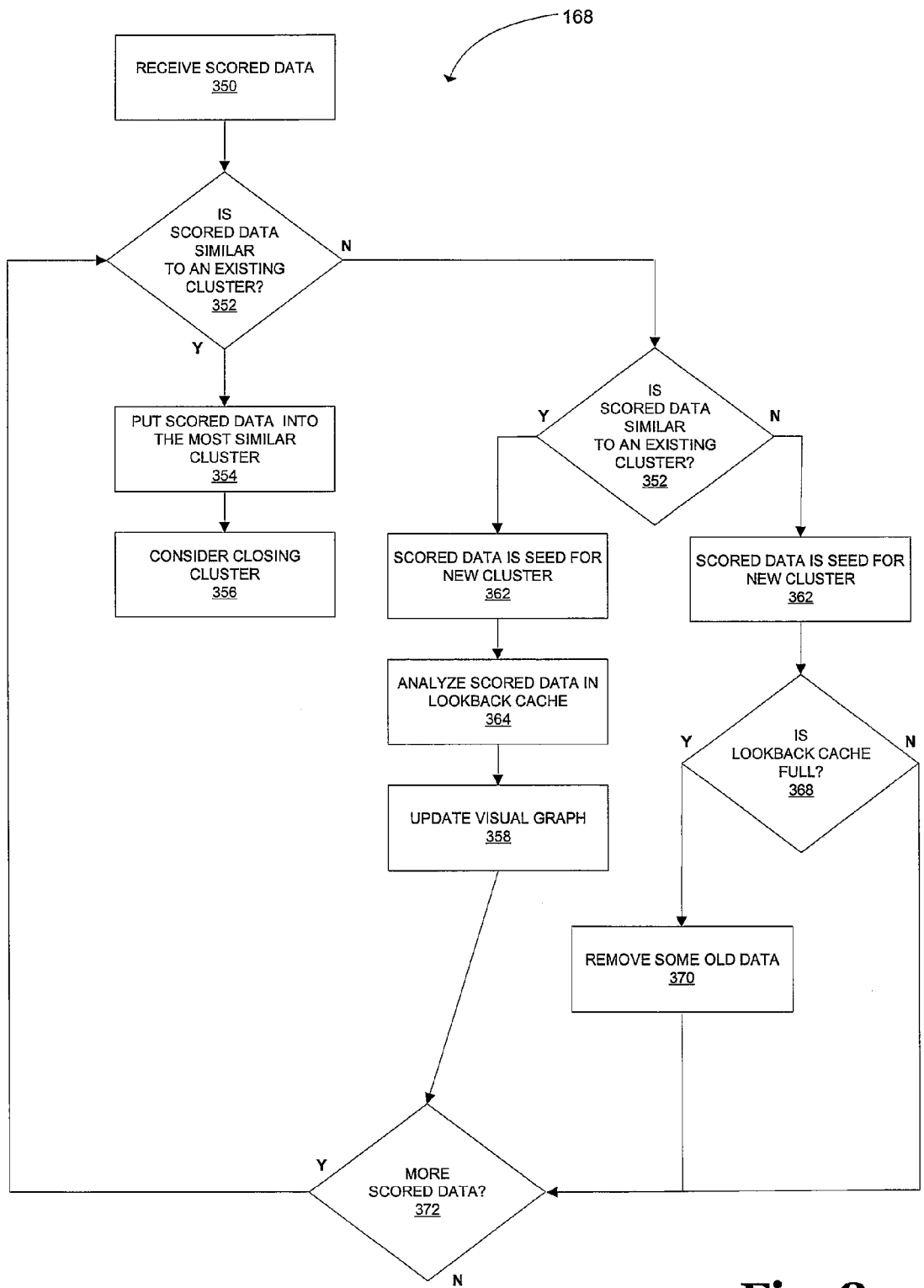
FIG. 8 is a flowchart for performing clustering analysis

Referring to FIG. 8 there is shown a flowchart for a method of performing a clustering analysis. At block 350 the method provides for the receiving of scored data. At decision diamond 352, the determination is made if the scored data, x, is similar to scored data in an existing cluster, y. For the similarity measure, let $$\delta(x, y) = \begin{cases} 1 & \text{if } x = y \\ 0 & \text{if } x \neq y \end{cases}$$

Suppose there are N observations on K variables, and that the data matrix is: $X = (x_{nk} | n=1, \ldots, N; k=1, \ldots, K)$, then the similarity measure is given by:

$$sim(x_i, x_j) = \sum_{k=1}^{K} w_k \delta(x_{ik}, y_{ik}),$$

where $0 \leq w_k \leq 1$ and $\Sigma w_k = 1$.

If the determination is made at decision diamond 352 that the scored data is similar to an existing cluster, then the method proceeds to block 354 where the scored data is put into the most similar cluster. At block 356, the determination is made if the cluster should be closed. At block 358 the visual graph is updated with new cluster information generated from block 354 and block 356. The method proceeds to clustering the next scored data record.

If the determination is made at decision diamond 352 that the scored data is not similar to an existing cluster, the method proceeds to decision diamond 360. At decision diamond 360, the determination is made of whether the scored data is above a threshold. By way of example but not of limitation, the threshold is a default parameter that can be modified by the analyst.

If the scored data is above the threshold, the method proceeds to process block 362 where the scored data becomes a seed for a new cluster. At block 364, the lookback cache is analyzed to determine if any scored data residing in the lookback cache is similar enough to the recently scored data. If there is some scored data residing in the lookback cache that is similar enough to the recently scored date, then the recently scored data is clustered with the similar scored data residing in the lookback cache, and the visual graph at block 358 is updated. The method then proceeds to perform the clustering of the next scored data record.

If the scored data is below the threshold at decision diamond 360, the method proceeds to block 366 where the recently scored data is put into the lookback cache. At decision diamond 368, the determination is made whether the lookback cache is full. If the lookback cache is full, then some of the old data is removed as described by block 370. If the lookback cache is not full the method, then the clustering process bypasses the updating of the visual graph and proceeds to cluster the next scored data record as described by diamond 372.

Screen Shot

Figure 9:
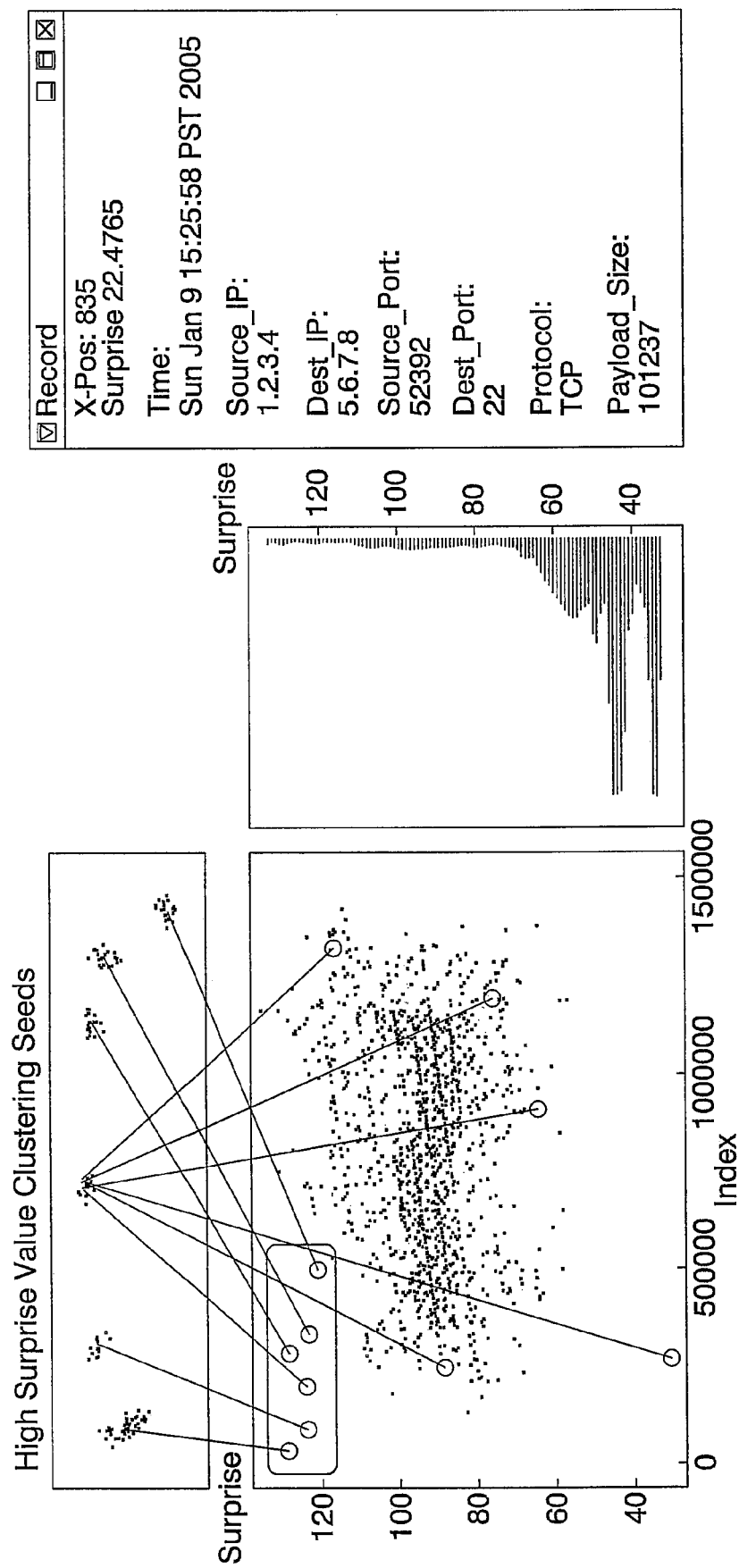
FIG. 9 is an illustrative screenshot showing a graph for analysis

Referring to FIG. 9 there is shown an illustrative screenshot showing a visual graph generated with results associated with performing the scoring and clustering described above. The illustrative screenshot is generated with 1.5 million observations that are identified along the coordinate axis labeled "index" of the largest visual graph. The score or "surprise value" associated with each observation is identified along the coordinate axis labeled "surprise" on the largest visual graph. Observations having surprise values that exceed a certain threshold are identified and form the basis for generating the visual graph titled "High Surprise Value Clustering Seeds". A histogram is also shown where the surprise values are the independent variables that are plotted on the vertical axis. The histogram is adjacent the visual graph labeled index and surprise. By way of example and not of limitation, the illustrative screenshot may be used to detect various forms of network intrusion including scanning and probing activities, low and slow attacks, denial of service attacks, and other activities that threaten the network. For scanning and probing activities, a simple inspection of the scored results may be used. By way of example and not of limitation, scanning and probing activities may be detected when a single remote address is used to scan multiple hosts and ports on a local network. These activities tend to cluster around a small band of surprise values, if not the same surprise value.

The illustrative systems and methods described above have been developed to assist the cyber security analyst identify, review and assess anomalous network traffic behavior. These systems and methods address several analytical issues including managing large volumes of data, creating a dynamically adaptable mathematical model, and detecting basic shifts in data patterns. It shall be appreciated by those of ordinary skill in the various arts having the benefit of this disclosure that the system and methods described can be applied to many disciplines outside of the cyber security domain.

Furthermore, alternate embodiments of the invention which implement the systems in hardware, firmware, or a combination of hardware and software, as well as distributing the modules and/or the data in a different fashion will be apparent to those skilled in the art and are also within the scope of the invention.

Although the description about contains many limitations in the specification, these should not be construed as limiting the scope of the claims but as merely providing illustrations of some of the presently preferred embodiments of this invention. Many other embodiments will be apparent to those of skill in the art upon reviewing the description. Thus, the scope of the invention should be determined by the appended claims, along with the full scope of equivalents to which such claims are entitled.

What is claimed is:

1. A method for detecting anomalies in a first plurality of observations, comprising:
    applying one or more formatting processes to the first plurality of observations to generate formatted data;
    generating a mathematical model based on said formatted data by iteratively decomposing a fully dependent model, the model indicating conditional independence relationships betweens aspects of the observations;
    calculating one or more joint probability distributions based on the relationships indicated by said model using said formatted data;
    generating scored data by applying a second plurality of observations to said model; and
    analyzing said scored data to detect said one or more anomalies wherein said formatting processes include a discrete decomposition of at least one variable of said first plurality of observations and wherein said discrete decomposition is a method of data representation comprising decomposing a continuous variable into a collection of discrete variables corresponding to a series of intervals, wherein each interval corresponds to a range of values of the continuous variable and a plurality of the intervals at least partially overlap.

2. The method of claim 1 wherein said second plurality of observations is said first plurality of observations.

3. The method of claim 1 further comprising the step of applying one or more formatting processes to the second plurality of observations prior to said generating.

4. The method of claim 1 wherein said second plurality of observations are real-time observations.

5. The method of claim 1 wherein said first plurality of observations and said second plurality of observations include Internet Protocol (IP) addresses.

6. The method of claim 1 wherein said second plurality of observations are representative of financial transactions.

7. The method of claim 1 wherein said first plurality of observations is received as a text file.

8. The method of claim 7 wherein said text file contains TCP dump data.

9. The method of claim 1 wherein said formatting processes include the process of including a first set of derived variables in said first plurality of observations.

10. The method of claim 9 wherein a derived variable is a function of one observation.

11. The method of claim 1 wherein said formatting processes include the addition of derived variables and the discrete decomposition of at least one attribute of said plurality of observations.

12. The method of claim 1 wherein said mathematical model is a conditional independence model.

13. The method of claim 12 wherein said conditional independence model is comprised of a mathematical relationship.

14. The method of claim 13 wherein said mathematical relationship includes a combination of terms, each term based on the probability of an observation having a specific characteristic.

15. The method of claim 1 wherein said joint probability distributions are stored in a data structure.

16. The method of claim 15 wherein said data structure is created by a method for selective storing of categorical data comprising:
    forming a data structure for the joint distributions of a set of variables;
    forming a guide tree to specify a subset of the joint distributions; and
    selectively storing only the joint distributions specified by the guide tree.

17. The method of claim 15 wherein said data structure is a partial AD tree.

18. The method of claim 17 wherein said AD tree is implemented using Judy arrays.

19. The method of claim 16 wherein said guide tree is based on said conditional independence relationships.

20. The method of claim 15 wherein said storing further comprises:
    storing historical count data in a count table; and
    adding newer count data to the table after applying an inflation factor that increases with time.

21. The method of claim 20 wherein said inflation factor increases exponentially with time.

22. The method of claim 1 wherein said analyzing said scored data further comprises identifying at least one threshold for anomaly detection.

23. The method of claim 22 wherein said analyzing said scored data further comprises comparing said scored data to said at least one threshold.

24. The method of claim 1 further comprising performing a clustering analysis on the scored data.

25. The method of claim 24 wherein said clustering analysis is performed to identify similar observations for further analysis.

26. A method for detecting anomalies in a plurality of observations including continuous or substantially continuous variables comprising:
receiving the plurality of observations;
decomposing at least one of the variables into a collection of discrete variables corresponding to a series of intervals to generate formatted data, the intervals corresponding to a predetermined range of values of the variable;
wherein a first one of the intervals overlaps with a second one of the intervals;
generating a mathematical model using said formatted data; and
determining that an observation is anomalous by applying said observation to said model.

27. The method of claim 26 wherein a first one of said intervals corresponds to a first range of values and a second one of said intervals corresponds to a second range of values which entirely includes said first range of values.

28. The method of claim 26 wherein each interval is of the same length.

29. The method of claim 26 wherein each interval corresponds to a range of angles of a circle.

30. The method of claim 29 wherein the substantially continuous variable is time.

31. A method for anomaly detection comprising:
receiving a plurality of observations;
determining count data from one or more of said observations and applying an inflation factor that increases with time to said count data;
updating a count table containing historical count data with said inflated count data; and
generating a mathematical model using said observations; and
determining that an observation is anomalous by applying said observation to said model using said count table.

32. A method for detecting one or more anomalies comprising:
receiving a plurality of observations;
generating a mathematical model using said observations;
generating joint distributions and selectively storing in a count table only those joint distributions specified by a guide tree generated by said model, wherein said count table is implemented using an AD tree and wherein newer count data is added to said count table after applying an inflation factor that increases with time; and
assigning a surprise score to one or more observations using said joint distributions and said model to detect one or more anomalies.

33. The method of claim 32 wherein said count table is implemented using Judy arrays.

34. A system for detecting one or more anomalies in a second plurality of observations, the system comprising:
an interface for receiving a first plurality of observations;
a memory capable of storing data associated with said first plurality of observations;
a processor in communication with said interface and said memory, wherein the processor executes:
a formatting process that:
receives said first plurality of observations;
stores said first plurality of observations in said memory; and
an analysis process that:
generates a mathematical model with said first plurality of observations by recursively decomposing a fully dependent model, said mathematical model capable of adapting dynamically to changes in data characteristics;
calculates one or more joint probability distributions from said first plurality of observations;
assigns a score to each observation by applying said second plurality of observations individually to said mathematical model; and
analyzes said scores to detect one or more anomalies wherein said formatting processes include a discrete decomposition of at least one variable of said first plurality of observations and wherein said discrete decomposition is a method of data representation comprising decomposing a continuous variable into a collection of discrete variables corresponding to a series of intervals, wherein each interval corresponds to a range of values of the continuous variable and a plurality of the intervals at least partially overlap.

35. Claim 34 wherein said mathematical model is a conditional independence model.

36. Claim 34 including the step of performing a clustering analysis on said observations.

* * * * *